United States Patent [19]
Kappe et al.

[11] 3,867,284
[45] Feb. 18, 1975

[54] WATER TREATMENT WITH NITROGEN DIOXIDE

[75] Inventors: Stanley E. Kappe, Washington, D.C.; David S. Kappe, Elkridge, Md.

[73] Assignee: Kappe Associates, Inc., Rockville, Md.

[22] Filed: Oct. 18, 1973

[21] Appl. No.: 407,587

Related U.S. Application Data

[63] Continuation of Ser. No. 259,034, June 2, 1972, abandoned.

[52] U.S. Cl. ...................... 210/15, 210/18, 210/63
[51] Int. Cl. .............................................. C02b 3/08
[58] Field of Search ............ 210/59, 63, 64, 15, 18; 423/400

[56] References Cited
UNITED STATES PATENTS 3,655,395  4/1972  Karnemaat ...................... 210/59

FOREIGN PATENTS OR APPLICATIONS 682,393  11/1952  Great Britain ...................... 210/63
711,489  7/1954  Great Britain ...................... 210/63

*Primary Examiner*—Thomas G. Wyse
*Assistant Examiner*—Benoit Castel
*Attorney, Agent, or Firm*—Young & Thompson

[57] ABSTRACT

Water is treated to reduce or eliminate the tendency of waste waters to pollute the waterways into which they are discharged, to purify drinking water supplies, to control taste and odor, and to disinfect it, by dissolving therein a small but effective amount of $NO_2$ base on the weight of solids suspended in the water.

4 Claims, No Drawings

WATER TREATMENT WITH NITROGEN DIOXIDE

This is a continuation of application Ser. No. 259,034, filed June 2, 1972, and now abandoned. su The present invention relates to the treatment of waste waters so as to reduce or eliminate the tendency of the waste waters to pollute the waterways into which the waste waters are discharged, and the treatment of water to purify drinking water supplies, to control taste and odor, and to disinfect it.

Such pollution of waterways has been detrimental to public health, fish life and other aquatic life and to the use of these waterways for recreation and as sources of industrial and drinking water supplies. Pollution and its potential hazards are not necessarily caused by the discharge of toxic wastes per se but are primarily due to the discharge of organic wastes in amounts such that there is not enough oxygen in the waterway to support the oxidizing respiratory needs of the aerobic purifying microorganisms that multiply very rapidly as long as the food and oxygen supply lasts. These organisms use the pollutants as a source of food and energy. The end product of the aerobic microorganisms used in the treatment of pollutants is carbon dioxide and water.

When the oxygen in the waterway and the re-oxygenation capacity of the waterway is inadequate, the aerobic organisms die, decay and putrify. Contrary to public opinion, these wastes continue to be biodegradable but the process of purification is taken over by anaerobic microorganisms, biota that secure food, energy and oxygen by putrefaction of the organic material in the waste waters. The by-products of the anaerobic organisms are foul-smelling, odoriferous chemical compounds and, unlike aerobic organisms, produce an environment that is conducive to pathogenic organisms and dangerous to public health. When the oxygen supply in the waterway again becomes adequate, the anaerobic organisms die and the aerobic organisms take over and use the remaining organic material in the waste water and that from the dead anaerobic and aerobic organisms for food and energy. When the food supply is adequate, the microorganisms multiply very rapidly. As the food supply is exhausted, the rate of growth of the microorganisms gradually declines until the death rate is greater than the growth rate and the waters thus become purified of organic wastes and living and dead bacteria. The purified waters become clear and of a quality that will support fish and other aquatic life and they can be used for recreational purposes and as a source of water supply for industrial and public use. The technology described briefly above is known as the growth curve of cellular microorganisms.

The organic material in waste waters is currently removed by the use of aerobic-type bacteriological systems. The degree of removal can be over 95% but generally a removal of between 85 – 90% is satisfactory. The systems are of the trickling filter type or some modification of the activated sludge process. On the trickling filter, the bacteria grow on stones. They remove the organic pollutants as the waste waters trickle downward through the stones. The living and dead bacteria are removed by a gravity-type clarifier before the liquid is discharged into the waterway.

In the activated sludge process and its modifications, the organisms are grown suspended in the liquid and air is supplied to the bacteria in the form of compressed atmospheric air diffused therein. The living and dead bacteria are also removed by a gravity-type clarifier before the liquid is discharged into the waterway. In the activated sludge processes, the settled organisms are continuously returned to the inlet end of the aeration tank as seed organisms. The excess organisms as in the trickling filter are discharged into a separate container for digestion by aerobic or anaerobic organisms or for disposal by incineration. The final product is disposed of generally on land as a humus for agricultural purposes or land fill.

Devices for promoting biological processes for the treatment of the soluble liquid waste fraction as well as the insoluble fraction are costly to construct and costly to maintain and operate and they are subject to frequent upsets based on the use of currently known technology, particularly if the waste waters contain pollutants that are toxic such as phenols and heavy metals and waste waters that reach the biological treatment plant in a septic condition due to anaeroboc digestion of the wastes in the sewers enroute to the plant. Pretreatment to remove or minimize the effects of these inhibitory chemical compounds and septic sewages has been helpful but not entirely satisfactory, particularly as to the septicity produced enroute due to the length of the interceptor sewer system conveying the waste waters to the treatment plant.

In order to reduce the cost of waste water treatment plants, physical-chemical methods are now being investigated. In these processes, the waste waters are treated with lime to impart to them a high pH as a means to hydrolyze the insoluble organic pollutants. The clarified wastes are then passed through a sand filter for further clarification and then on to and generally through filters containing carbon media for absorption of the soluble organic pollutants. The carbon filters do a good job of removal but the systems do not appear to be economically feasible. The carbon filters clog readily and the cost of regenerating and replacing lost and spent carbon based on current knowledge is too high. Ozonation is now being studied in lieu of the carbon filters.

The physical-chemical processes and the biological processes with the aid of chemicals do a good job of removing the nutrient phosphates but the removal of the nutrient nitrogen as ammonia still is a problem. Air stripping at high pH has been tried as well as such oxidants as chlorine, oxy acids, potassium permanganate and ozone. Each seems to have its drawbacks. Ozone appears to be the most promising.

It is known in the art that in aerobic biological processes, the bacteria oxidize and synthesize the organic pollutants to $CO_2 + H_2O +$ cellular material. In the process, the bacteria oxidize the alcohols through aldehydes and ketones to organic acids and by further oxidation and decarbolyzation into $CO_2$ and $H_2O$. For example, it is well known that when a hydroxy acid such as pyruvic acid is formed, upon further oxidation it is easily oxidized to an aldehyde $+ CO_2 + H_2O$, which method is used to degrade an acid step-by-step by elimination of a carbon as $CO_2$. It is also known that organic chemical compounds in general can be oxidized through alcohols into dibasic organic acids such as oxalic acid which for example on further oxidation are easily oxidized to $CO_2$ and $H_2O$. The bacteria apparently follow the same mechanisms in the oxidation and synthesis of organic pollutants which they use as a source of food and energy and thus purify the waste waters of the organic pollutants. Aerobic organisms also exist in the biota that oxidize ammonia to nitrates and aerobic-anaerobic organisms that denitrify nitrates to molecular nitrogen.

In some waste water treatment processes, nitrates in the form of ammonium nitrate and sodium nitrate have been added to the waste waters being treated, as a source of oxygen and/or nitrogen. It has been found by experience that the aerobic organisms can use the oxygen in nitrites and nitrates if the supply of dissolved oxygen in the waste waters is not sufficient. The aerobic bacteria do not seem to be able to use for respiration the oxygen in other chemical compounds containing oxygen. The denitrifying organisms apparently release molecular oxygen when the nitrates are denitrified to molecular nitrogen.

It has been found by experiments that the microorganisms can and do use nitrogen dioxide as a source of oxygen if adequate residual dissolved oxygen is not available in the waste waters being treated. Accordingly, the present invention uses nitrogen dioxide as (1) a source of oxygen in part or in its entirety for the microorganisms, (2) as an oxidizing agent alone or as an aid to the aerobic-anaerobic bacterial processes, (3) as a hydrogen acceptor for biochemical reactions, (4) as a chemical reagent that the bacteria can use as a source of nutrient nitrogen as well as a source of life-sustaining oxygen and at the same time as an oxidizing agent to work with and supplement the oxidation being done by the bacteria, (5) as a powerful oxidizing agent that will oxidize organic compounds such as fats, alcohols, aldehydes, ketones, carbohydrates with aldehyde ends and organic acids into $CO_2$ and $H_2O$, (6) as an oxidizing reagent to oxidize ammonia and ammonium compounds to molecular nitrogen, (7) as an oxidizing agent that will oxidize toxic inorganic chemical compounds such as cyanides and phenolcreosotes and the like compounds to harmless biodegradable and taste- and odor-free compounds, (8) as a chemical reagent that will convert such organic compounds as cellulose and fats to a more biodegradable compound, (9) as a chemical reagent that will react with primary amines and amino acids which contain an amino group and will yield nitrogen and an alcohol as a degradation product, (10) as a chemical reagent that will react with urea and will yield $CO_2 + N_2$ as the complete degradation product, and (11) as a chemical reagent for lysis or disintegration of the microorganisms cell walls so that the material of which the organisms are made can be destoyed by serving as a source of food and energy for the other living organisms and thus elliminate or reduce the problem of sludge disposal.

By nitrogen dioxide is meant $NO_2$ and its precursors, e.g. $N_2O$ and $NO$, which form $NO_2$ in situ in the presence of oxygen.

Accordingly, it is an object of the invention to use nitrogen dioxide alone, in series or in parallel with biological waste water treatment processes as an enhancement to biological treatment of waste waters, for destruction of taste and odor compounds in drinking water, and for destruction of toxic microorganisms and organic and inorganic chemical compounds in waste water and the like.

Municipal waste water treatment plants handle more than domestic wastes from homes and apartments. On a nationwide average, about 55% of the waste water comes from homes and commercial establishments and 45% from industry.

Increasingly complex manufacturing processes, coupled with rising industrialization, create greater amounts of exotic wastes potentially toxic to humans and aquatic life not only in the discharges from industry into waterways and minicipal sewer systems but also in the form of household products. These wastes per se might be biodegradable but when they are discharged into a sanitary sewer system, these harmless waste waters mix with other chemicals and domestic wastes and often become nonbiodegradable or toxic or otherwise resistant to biological treatment processes.

Domestic sewages that are fresh are more amenable to aerobic biological treatment than domestic wastes that have become septic in storage or enroute to the treatment works due to the length of time in transmission. In long transmission mains, due to lack of a source of oxygen, anaerobic organisms take over and decompose by putrefaction the organic material in the waste waters. Such waste waters being decomposed to a different degree on reaching the waste water treatment plant are anaerobic and resistant to biodegradability and are saturated with hydrogen sulphide which is toxic to bacteria as well as man and contain inorganic and organic compounds that are at reduced oxidation levels and must be raised to higher oxidation levels to prevent pollution of waterways. In order to make these wastes amenable to aerobic biological treatment, the toxic products must be neutralized and the conditions in the sewers enhancing anaerobic conditions must be changed so as to provide in effect an aerobic atmosphere.

By applying nitrogen dioxide in the sewer system some distance ahead of the plant, at the plant, and in the seed sludge being recirculated in the plant singly or in any combination, the toxic and septic waste waters can be readily converted to conditions very amenable to aerobic biological treatment, thereby to provide an aerobic atmosphere in the waste waters and oxidize the inorganic and organic wastes from a lower level to a higher oxidation level. Such treatment with oxides of nitrogen will prevent the production of obnoxious odors in the vicinity of the plant and will cut down on the capital cost of construction and operating costs.

The lower oxidation products of sulphate through sulphur are a source of trouble in aerobic treatment. Under anaerobic conditions the sulphur bacteria reduce sulphates to hydrogen sulphide, and under aerobic conditions the sulphur-oxidizing bacteria use a large amount of dissolved oxygen and carbon dioxide oxidizing reduced forms of sulphur to sulphates. Unfortunately, the sulphur-oxidizing organisms are predominately autotrophic. That is, they require neither organic carbon nor organic nitrogen for growth but are able to build up carbohydrates, fats and proteins out of carbon dioxide and inorganic salts thus producing a higher organic load on the treatment plant and in the process a larger amount of oxygen is required for respiration and metabolism. The oxidation of sulphites by molecular dissolved oxygen in water is slow but by nitrogen dioxide they are rapidly oxidized to sulphates, the final oxidation state of sulphur. By using the nitrogen dioxide for oxidation of reduced forms of sulphate, the sulphur-oxidizing bacteria can be eliminated at a great saving in operating cost. In addition, clarification will be improved because the predominant sulphur-oxidizing bacteria are filamentous and do not settle well in gravity clarifiers. A great source of sulphur bacteria is supernatant liquors from anaerobic digesters and septic sewages enroute to the treatment works.

Since waste waters contain many lower and complex oxidation products that are oxidized to higher levels, the advantages of the use of the nitrogen dioxide for direct oxidation singly, in series or in parallel with aerobic biological treatment of reduced organic and inorganic products to higher oxidation levels becomes very evident.

Nitrogen dioxide can be applied and used at the source of the pollutant discharges from industry with or without pretreatment facilities and ahead of or after pretreatment facilities.

In municipal or regional systems, nitrogen dioxide can be applied and used in the system some distance above and ahead of the treatment facilities; in the wet well and in the pump discharge main of pump stations; at the head end of treatment systems or at the head end of any of the treatment units including supernatant liquid from anaerobic digesters; in anaerobic or aerobic digesters; in the compressed air or surface aeration systems of aeration tanks, in return seed sludges, in recirculated flows and in the final treated effluent and at other locations.

Nitrogen dioxide and its precursors are very soluble in water. They can be applied as a solution in water using a rotometer or by some other similar device to measure the gas dosage being applied to the solution water or they can be applied as a gas through similar metering and control devices directly to the waters being treated, or directly as a liquid. It is preferred to use nitrogen dioxide as a gas after passing the gas through a rotometer or some other measuring and control devices and to apply the gas directly to the waste water being treated. At locations where the depth and flow are not adequate to dissolve all the gas being applied, it will be necessary to apply nitrogen dioxide in solution. The gas dissolves very rapidly and can be applied into cold waters or into hot waters without any apparent difficulty. The pipeline feeding the gas, however, should be insulated or kept warm because at temperatures below 70.1° F. and atmospheric pressure nitrogen dioxide changes from a gas to a liquid.

When nitrogen dioxide is introduced into waste water which is at a temperature above the boiling point of nitrogen dioxide at atmospheric pressure, it is desirable that the point of introduction be sufficiently below the surface of the waste water that substantially complete dissolution of the $NO_2$ will occur without loss to the atmosphere. It has been found for example that at an introduction rate of about 10 cubic feet of $NO_2$ per hour, the point of introduction should be submerged at least about 2 feet so as to prevent bubbles of $NO_2$ reaching the surface. At about 30 cubic feet per hour, the $NO_2$ should be introduced at a depth of at least about 3 feet; while at a depth of about 4 feet or more, the introduction rate of $NO_2$ can be as great as desired without loss to the atmosphere.

Temperatures for the reactions are not critical. Room temperature or the outside temperatures of the atmosphere or of the waters likely to be treated are not critical except that the pipe conveying the gas to the point of treatment should be insulated or heated by a thermal cable or other means, for the reason pointed out above. Nitrous oxide, nitric oxide and nitrogen trioxide remain as a gas at temperatures below −21° C. and thus need no protection against freezing.

Pressure is not critical. The reaction proceeds at atmospheric pressure as well as at higher and lower pressures, particularly at pressures normally encountered in water treatment and waste water treatment plants.

During the reaction, the pollutant is oxidized by the nitrogen dioxide. For example, nitrous oxide is generally not as powerful as nitric oxide as an oxidizing agent. Therefore, less nitric oxide will be required to oxidize the same pollutant. To treat the same pollutant, less nitrogen dioxide ($NO_2$) is needed to treat the same pollutant than if nitric oxide (NO) were used.

In the art of waste water treatment, the biochemical oxygen demand of the untreated waste waters ($BOD_5$) over a period of 5 days is generally used as a design parameter for biological waste water treatment plants. For example, the average $BOD_5$ of domestic waste waters is around 200 mg./l. or they contain approximately 1,668 pounds of $BOD_5$ per million gallons of waste water. To completely destroy this organic loading by biological treatment, approximately 1 to 1.25 pounds of oxygen are required per pound of $BOD_5$ removed. Of the total amount of oxygen required, approximately 0.5 pound is consumed by the bacteria for oxidation and conversion of approximately 37% of the organic material into $CO_2$ and $H_2O$ and 63% of the organic material is synthesized into cell material. An addition 0.75 pound must be provided then to completely oxidize the cell material produced which in turn produces an ash content of 0.12 pound per pound of $BOD_5$. Approximately 1.0 pound of the oxygen is required per 200 pounds of active bacteria for respiration, and for stronger waste waters two to three times as much is required.

It can readily be seen from the above figures that if chemical oxidizer are used for direct oxidation, the amount of oxygen required to oxidize pollutants may be as low or lower than 0.5 pound of oxygen per pound of biodegradable organic material and in other waste waters it may be much higher, perhaps twice as much or more, than that required by biological treatment due to the oxidation of pollutants that are resistant to biological treatment but are readily oxidized by chemical oxidizing reagents. For example, lignin, which is almost nonbiodegradable, can be completely oxidized by nitrogen dioxide.

When industrial waste waters are treated, for example industrial waste waters containing phenols, cyanides, etc., the amount of nitrogen dioxide required for complete destruction may be as much as five times greater than that required for oxidizing pollutants in domestic sewage. The term "phenols" is used herein in its ordinary sense in the art of waste water treatment, to designate the mixed aromatic hydroxy compounds produced by anaerobic decomposition of the proteins in sewage and by metabolism in the human body. These are ordinarily present in trace amounts to a maximum of about 15 milligrams per liter; but when industrial waste is added to the sewer system, the content of phenols as for example from steel mill operations can be as much as 1,000 milligrams per liter or more.

On river and lake waters used as sources of water supply, the amount of nitrogen dioxide required should be very small becuase the amount of pollutants in such waters is generally very small. These pollutants, however, are generally a source of taste and ordors in such waters and must be destroyed. Chlorine and potassium permanganate are generally used to destroy these taste and odor-producing compounds. In the present invention, it is proposed to use nitrogen dioxide for this purpose because nitrogen dioxide provides complete destruction without forming additional products and it does not increase the dissolved solids content of the water.

The following examples are given, not to limit the invention, but rather to enable persons skilled in the art to practice the invention.

EXAMPLE 1

Waste water at a temperature of 20° C. and containing 10 milligrams per liter of phenols is treated at the source before the untreated waste waters are discharged into the waterway or sewage collection system, by applying nitrogen dioxide in vapor phase at a submergence of 4 feet through a control valve followed by a rotometer at a flow rate that can vary from 1 to 7 milligrams of $NO_2$ per milligram of phenols and in the present example is 2 milligrams of $NO_2$ per milligram of phenols. Treatment is batchwise with a detention time of at least 15 minutes, specifically, 30 minutes in the present example. The phenols and cyanides are readily oxidized, largely to carbon dioxide and water.

EXAMPLE 2

Example 1 is repeated except that the nitrogen dioxide is applied to the waste waters at the head end of a treatment plant constructed to treat combined industrial and domestic waste waters. The quantity of pollutants ($BOD_5$) is 600 milligrams per liter of waste water and the nitrogen dioxide is applied at a rate of 1 to 32 milligrams per milligram of $BOD_5$, or 3 mg./mg. in this example.

EXAMPLE 3

Example 1 is repeated except that the $NO_2$ is applied upstream in the sewer system from the treatment works in a pipeline conveying the waste waters. The $BOD_5$ is 400 milligrams per liter and the rate of $NO_2$ application is as in Example 2. Treatment at this location prevents the waste waters from becoming septic and odoriferous and provides chemical oxidation as a pretreatment of the waste water to a desirable degree.

EXAMPLE 4

Example 1 is repeated, except that the $NO_2$ is applied to the effluent waste waters of the primary clarifier tank between the primary tank and the biological treatment unit so as to reduce the organic load on the biological treatment unit and to destroy toxic compounds that may be in the untreated waste waters. Treatment at this location conserves nitrogen dioxide, because the primary clarifier tank normally removes by gravity settling about 20–35% of the organic pollutants in the untreated waste waters. The $BOD_5$ is 350 mg./liter and the $NO_2$ application rate is the same as in Examples 2 and 3.

EXAMPLE 5

Example 1 is repeated, except that the nitrogen dioxide is applied ahead of the biological treatment unit as a source of nutrient nitrogen as well as a source of oxygen for biological metabolism and at a rate of about 1 pound of nitrogen dioxide per 200 pounds of biological life determined as volatile suspended solids in the system. The consumption rate can be about 1 milligram of nitrogen dioxide per milligram of $BOD_5$ when the nitrogen dioxide serves as a nutrient.

EXAMPLE 6

Example 5 is repeated, except that nitrogen dioxide is applied to the flow which is returned, from the clarifier tank that follows the biological treatment unit, to the head end of the treatment plant. The quantity of nitrogen dioxide applied is about 1 to 25 milligrams of $NO_2$ per gram of mixed liquor suspended solids, in this example 3 milligrams $NO_2$ per gram of solids, as the return flow is from a trickling filter type of plant. For trickling filters, the average suspended solids in the return flow is generally less than 1,000 milligrams per liter and the $BOD_5$ thereof is usually about 500 milligrams per liter. In activated sludge-type plants, the average suspended solids in the return flow is about 10,000 milligrams per liter and the $BOD_5$ thereof is approximately 5,000 milligrams per liter. This oxygen demand in both cases is caused by respiration requirements of the organisms and is generally expressed as 5 milligrams of oxygen per hour per gram of volatile suspended solids. In this example, nitrogen dioxide is used primarily as an additional source of nutrient nitrogen and oxygen and to oxidize some of the byproducts of aerobic oxidation. It is desirable to limit the quantity of nitrogen dioxide in this example, as substantially more tends to kill the biological life, and this is not desirable at this point of the biological treatment. It may be that, when such low concentrations of $NO_2$ are used, the $NO_2$ neutralizes the toxic by-products of metabolism leached from the organisms into the water in which the organisms are suspended. It may also be that $NO_2$ kills filamentous organisms which are undesirable and which do not settle well, but does not kill the desirable biota at such low concentrations of $NO_2$.

EXAMPLE 7

Example 1 is repeated, except that nitrogen dioxide is applied to the supernatant effluent from an anaerobic digestion tank before the supernatant is discharged back into the liquid phase of the treatment plant. Anaerobic digester supernatant effluents are very toxic to biological treatment and have a high oxygen demand. The $BOD_5$ is 400 milligrams per liter and the $NO_2$ flow rate is as in Example 2.

EXAMPLE 8

Example 1 is repeated, except that nitrogen dioxide is applied to the recirculated stream of a secondary aerobic digester so as to destroy the cell wall of the microorganisms and to make them available in the destroyed form as a source of food and energy in a subsequent biological treatment unit and to reduce or substantially eliminate the problem of sludge disposal. The $BOD_5$ is 300 milligrams per liter and the rate of $NO_2$ application is 1 to 6 milligrams per milligram of $BOD_5$, or 2 milligrams $NO_2$ per milligram $BOD_5$ in the present example.

EXAMPLE 9

Example 8 is repeated except that the $NO_2$ is applied to the contents of an anaerobic digester.

EXAMPLE 10

Example 1 is repeated, except that nitrogen dioxide is applied to the final plant effluent before it is discharged into the waterway to oxidize any unoxidized ammonia which may be in the plant effluent to a higher oxidation level such as gaseous nitrogen and water. Ammonia is thus eliminated as a nutrient for algae and other aquatic growth in the receiving waterway. The ammonia nitrogen content of the effluent is 7 milligrams per liter and the rate of $NO_2$ application is 1–14 milligrams, in this case 3 milligrams, of $NO_2$ per milligram of ammonia nitrogen,

EXAMPLE 11

Example 1 is repeated, except that nitrogen dioxide is applied to the final effluent of the treatment plant before it is discharged into the waterway, this time as a disinfectant or sterilizing agent to kill the microorganisms and destroy the vira in the plant effluent. The content of microorganism and virus cell material prior to treatment is 15 milligrams per liter and the rate of $NO_2$ application is 1–6 milligrams per milligram of microorganisms and virus cell material, in this case 2 milligrams per milligram.

EXAMPLE 12

Example 1 is repeated, except that the nitrogen dioxide is added to the waste waters for oxidation of lower oxidation state sulphur compounds to the final oxidized state sulphate. This is to prevent the putrefaction enroute to the treatment works due to the breakdown of sulfur compounds by anaerobic microorganisms into hydrogen sulphide and other odoriferous reduced sulphur compounds. The waste water contain 5 milligrams per liter of lower oxidation state sulphur compounds and the $NO_2$ is used at a flow rate of 1–3 milligrams per milligram of reduced sulphur compounds, in this example 1 milligram $NO_2$ per milligram reduced sulphur compounds.

EXAMPLE 13

Example 1 is repeated, except that nitrogen dioxide is applied at the inlet end of the water filtration treatment plant as a disinfectant and as a chemical reagent to neutralize and oxidize toxic material and/or taste- and odor-producing material in the source of water supply for drinking water. The nitrogen dioxide is supplied at the rate of 1–24 milligrams per liter, in this example 10 milligrams per liter, to oxidize and destroy the taste- and odor-producing compounds before the water is pumped into the system for public distribution.

EXAMPLE 14

Example 1 is repeated, except that nitrogen dioxide is applied to the effluent of a treatment plant before the effluent is discharged into the waterway to destroy and/or render less potent vitamins such as $B_{12}$ and biotin and plant growth homones such as indol and enzymes that are produced in the plant effluent by the biota in the waste waters being treated as a by-product of metabolism. These substances feed algae and other aquatic plants and are known to be produced in biological treatment plants. The $B_{12}$ content is about 76 micrograms per 100 grams of suspended solids and the $NO_2$ is applied at a rate of about 2 milligrams per milligram of plant growth factor.

From a consideration of the foregoing disclosure, therefore, it will be evident that the invention comprises the application to waste water of a small but effective amount of $NO_2$, the amount being effective to reduce the pollutant tendency of the waste water prior to discharge into a waterway. Depending on the particular function of the $NO_2$ and the system considered, the small but effective amount will be at least about 1 milligram of $NO_2$ per gram of suspended solids in the waste water. For most purposes, there is no upper limit of $NO_2$, the use of excess $NO_2$ being merely wasteful. In general, however, it is not useful to apply $NO_2$ at a rate greater than 50 grams per gram of a suspended solid.

From a consideration of the foregoing disclosure, therefore, it will be evident that the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described our invention, we claim:

1. A method of treating domestic sewage waste water, comprising dissolving an effective amount of nitrogen dioxide in domestic sewage waste water containing as organic materials: bacteria, other microorganisms, fats, alcohols, aldehydes, ketones, carbohydrates with aldehyde ends, organic acids, ammonia, ammonium compounds, cellulose, primary amines, amino acids and urea, said effective amount being from 1 milligram to 50 grams of nitrogen dioxide per gram of organic material, and then discharging the treated domestic sewage waste water into a waterway, said amount being effective to serve as a source of oxygen for microorganisms present in the waste water, and as an oxidizing agent for aerobic-anaerobic bacterial processes in the waste water, and as a hydrogen acceptor for biochemical reactions in the waste water, and as a chemical reagent that bacteria in the waste water can use as a source of nutrient nitrogen, and as an oxidizing agent that will oxidize fats, alcohols, aldehydes, ketones, carbohydrates with aldehyde ends and organic acids present in the waste water to molecular nitrogen, and as a chemical reagent to convert cellulose and fats present in the waste water to more biodegradable compounds, and as a chemical reagent that will react with primary amines and amino acids which contain an amino group present in the waste water to yield nitrogen and alcohol as degradation products, and as a chemical reagent that will react with urea present in the waste water to yield carbon dioxide and nitrogen as degradation products, and as a chemical reagent for lysis or disintegration of the cell walls of microorganisms present in the waste water so that the material of which the organisms are made can be destroyed by serving as a source of food and energy for other living organisms present in the waste water.

2. A method as claimed in claim 1, said amount being 1 to 32 milligrams of nitrogen dioxide per milligram of organic material.

3. A method as claimed in claim 1, and introducing said nitrogen dioxide into said domestic sewage waste water in vapor phase beneath the surface of the domestic sewage waste water.

4. A method as claimed in claim 3, in which the point of introduction of said nitrogen dioxide is at least about 2 feet below the surface of the domestic sewage waste water.

* * * * *